(12) United States Patent
Daniel et al.

(10) Patent No.: US 7,457,458 B1
(45) Date of Patent: Nov. 25, 2008

(54) METHOD AND APPARATUS FOR DEFINING AND CORRECTING IMAGE DATA

(75) Inventors: Florian Daniel, Magdeburg (DE); Gerald Krell, Magdeburg (DE); Bernd Michaelis, Biederitz (DE)

(73) Assignee: INB Vision AG., Magdeburg (DE)

( * ) Notice: Subject to any disclaimer, the term of this patent is extended or adjusted under 35 U.S.C. 154(b) by 491 days.

(21) Appl. No.: 09/723,540

(22) Filed: Nov. 27, 2000

(30) Foreign Application Priority Data

| Nov. 26, 1999 | (DE) | ................................. 199 56 842 |
| May 5, 2000 | (DE) | ................................. 100 22 009 |

(51) Int. Cl.
*G06K 9/00* (2006.01)
*G06K 9/62* (2006.01)

(52) U.S. Cl. .................... 382/159; 382/156; 382/162
(58) Field of Classification Search ................. 382/156, 382/157, 155, 254, 275, 274, 159, 162
See application file for complete search history.

(56) References Cited

U.S. PATENT DOCUMENTS

| 5,052,043 A * | 9/1991 | Gaborski .................... 382/157 |
| 5,091,773 A | 2/1992 | Fouche et al. ................. 358/10 |
| 5,095,443 A | 3/1992 | Watanabe | |
| 5,231,481 A * | 7/1993 | Eouzan et al. .............. 348/658 |
| 5,475,447 A | 12/1995 | Funado ........................ 348/745 |
| 5,506,696 A * | 4/1996 | Nakano ....................... 358/504 |
| 5,748,329 A * | 5/1998 | Chang ......................... 382/167 |
| 5,774,230 A * | 6/1998 | Goto ........................... 382/162 |
| 5,929,906 A * | 7/1999 | Arai et al. ................. 348/223.1 |
| 6,119,112 A * | 9/2000 | Bush ............................. 706/25 |
| 6,259,824 B1 * | 7/2001 | Sekiya ........................ 382/274 |

FOREIGN PATENT DOCUMENTS

| DE | 197 26 877 C2 | 1/1999 |
| JP | 04 200081 A | 7/1992 |
| JP | 09 319339 A | 12/1997 |
| WO | WO 99/11062 | 3/1999 |

OTHER PUBLICATIONS

G. Krell, A. Herzon, and B. Michaelis; An Artificial Neural Network for Real-Time Image Restoration; Jun. 1996; IEE Instrumentation and Measurement; pp. 833-838.*

* cited by examiner

*Primary Examiner*—Matthew C. Bella
*Assistant Examiner*—John B Strege
(74) *Attorney, Agent, or Firm*—Collard & Roe, P.C.

(57) ABSTRACT

A method and an apparatus for modifying image forming data including the steps of establishing parameters of an artificial neuronal net during a teaching process on the basis of uncorrected image data and of providing target data based on the original image to be reproduced. The outputs of the neuronal net are utilized for operating an image reproduction device in accordance with data signals modified by the neuronal net on the basis of deviations between the error-free original image and the image to be reproduced.

4 Claims, 4 Drawing Sheets

METHOD AND APPARATUS FOR DEFINING AND CORRECTING IMAGE DATA

BACKGROUND OF THE INVENTION

1. Field of the Invention

The invention, in general relates to a method and to an apparatus for defining and at least partially correcting image data and, more particularly, to the definition and correction of data used to form an image on a video or projection screen as well as on other electronic image reproduction devices.

2. The Prior Art

It is often necessary and in some instances desirable to correct or otherwise affect the data used for forming an image on a video or projection screen of the kind used, for instance, in television sets, monitors, displays or projectors. The screen may be part of a cathode ray tube, or other plasma, liquid crystal display or micro reflector technology. Suitably adapted, the invention is also useful in connection with X-ray image forming technology, digital copiers, scanners, image transformers, overhead and other projectors and the like.

The method is practiced to correct errors which typically occur in the reproduction of images. Such errors may be blurs, distortions, irregular illumination, lightness, brightness, hue, color and convergence. Practicing the methods leads do reduced demands on the mechanical, optical and electronic components such as cathode ray guns, LCD panels or projection lenses as well as to a significant adjustment or calibration of such components. However, other shortcomings of projection and image forming screens as well as distortions resulting from oblique projections, known as Keystone distortions, may also be corrected.

The field of use of the invention is by no means restricted to the correction of image data errors, i.e. the reduction or elimination of undesirable changes in image data occurring in a real image reproduction systems as opposed to an ideal system. Basically, the invention may be used in connection with systems in which image data provided for image formation are subjected, prior to their input into the image reproduction system, to modifications definable by predetermining the result of modifying original image data into transformed image data, as, for instance, on the basis of test images.

Hereinafter, "image reproduction system" is intended to refer to such systems in general. Moreover, "digital" and "digitized" image data or "digitized test image data" are not to be understood as image data existing primarily as digital image data, but also as image data prepared by digitizing primarily analog image data.

A video projection apparatus is known from U.S. Pat. No. 5,231,481, for instance, which is provided with a correction feature operating on the basis of feed-back for correcting errors in a projected image caused, for instance, by optical or electrical components of the projection apparatus. Feed-back is provided by a video camera which takes an exposure of a test image projected by the video projection apparatus. The exposure taken and stored by the video camera is compared to image data of the original of the test image which is deemed to be free of errors, for the purpose of calculating and storing corrective signals. These corrective signals are utilized to control the control units of the projection apparatus in order to improve the quality of the projected image.

A method disclosed by U.S. Pat. No. 5,475,447 relates to the automatic correction of errors of convergence and distortion of an image projected onto a rectangularly framed projection surface by a video projector. The method is based of a video projector which is controlled by a video signal generator. A camera takes an exposure of the projection surface, and by means of a signal processor generates a video signal which is stored in an image storage. A computer calculates the coordinates of the four corner points of the rectangular projection surface and determines the position of reference points within the projection surface on the basis of the coordinates. At positions corresponding to the calculated positions of the reference points a signal generator then generates marked or tagged video signals. The video signal controls the video projector which projects an image including the marks. The digital camera stores the image including the marks in an image storage. A corrective signal for the automatic convergence and distortion correction of the camera is derived from any deviation between the positions of the reference points stored in the image storage and the positions of the stored marks.

The video projection apparatus of U.S. Pat. No. 5,091,773 is also provided with a correction feature operating on the basis of negative feed back for correcting, in a projected image, errors which may be caused, for instance, by the optical system. To this end, a test image consisting of light image points arranged as a raster is projected by the projected apparatus on a projection screen. An image of the image on the projection screen is formed on a substantially opaque filtering mask which is transparent only at those image points at which the image of an error-free test image displays light image points. Corrective signals for controlling the video projector are derived from the value of the light intensity which permeating the filtering mask.

A common feature of the known methods is that a corrective signal for improving the quality of the projected image is calculated on the basis of a test image stored by a digital camera for controlling the image generator of the projection system in order to correct errors of distortion or convergence.

The calculation of the corrective values is complex, and it is valid only for the analyzed image point sites. In respect of intermediate positions, the known methods require interpolations. This, too, is complex and provides no more than a mere approximation. Moreover, if is possible to correct only individual errors, primarily those relating to the geometry of an image. Other errors in the transmission characteristics of the reproduction system are not being addressed. The known methods require manipulation of control electronics or mechanical or optical system. In some instances it is even necessary to modify the image or projection screens. Another disadvantage is that the calculation of the corrective values has to be repeated each time an image is reproduced and for each image reproduction system used.

This would seem to be of particular disadvantage where similar image reproduction systems known to be inflicted with substantially identical problems of image formation are used substantially simultaneously.

OBJECTS OF THE INVENTION

It is, therefore, a general object of the invention to provide a method and related apparatus for reproducing images of superior quality.

A more specific object relates to a method and to an apparatus which avoid the necessity of manipulating electronic, mechanical or optical systems of an image reproducing apparatus.

Yet another object of the invention is to provide a method and an apparatus for modifying image forming data to be reproduced to control all of the transmission properties of an image reproduction system.

BRIEF SUMMARY OF THE INVENTION

In accordance with the invention, there is provided a method of defining and at least partially correcting errors of an image reproduction system by feeding digital image forming data to the input of a neuronal net which is implemented in appropriate circuitry for correcting errors and for forming input data for an image reproduction system, the parameters of the neuronal net having been defined by a preceding learning process which utilizes a test image of predetermined quality for generating target data.

In a preferred embodiment of the invention there is provided an apparatus including circuitry for accommodating a neuronal net the outputs of which are connected to the inputs of an image reproducing system and the parameters of which have been established in a preceding learning step based upon a test image of predetermined quality, a storage for image forming data connected to the inputs of the neuronal net, and an image recording device for generating digitized image data of an uncorrected reproduced image of the test image and connected to the inputs of the neuronal net for a time necessary to define the parameters of the neuronal net during the learning process.

Advantageously, the image recording device consists of a digital camera optionally connected to the neuronal net by way of an image data storage.

The basic concept of the method in accordance with the invention is to utilize a neuronal net as a locally functioning digital filter for advance correction with a mono-layered net being used where the stimulation characteristics of the image elements are linear. In terms of program structure the neuronal net may be implemented on a personal computer or in an application specific circuit.

In the learning phase, the input pattern for the neuronal net is an uncorrected test image produced by the image reproduction system captured by an image recording device such as a camera. The actual digital image data of the test image directly define the target data for the training process.

Following the learning process, the inputs of the neuronal net are fed with data of the image to be reproduced, and its outputs provide direct pixel input values for the image reproduction system which will thus be provided with pre-corrected original image data. In this manner, any errors in the transmission behavior of image formation, optics and projection of any images to be reproduced will have been corrected so that as a result of having been compensated or corrected errors will no longer be visible on the projection or image forming screen.

The special advantage of the invention is, therefore, that neither deflection 20 nor intensity modulation of the image reproduction system require manipulation, or that the image or projection screens need to be modified.

The system is capable of simultaneously addressing several types of error at the same time. These may be image distortions and blurring caused by geometric distortions or optics which are out of focus, oblique projection (Keystone distortion) or curved projection screens. Also, irregular lightness distributions as may be caused by variations in the reflective properties of the projection screen or by the optical system or light source, will be corrected. In the case of colored image projection, errors in color which may occur at the transition between different colors (color seams) will also be corrected. A special process maintains the color balance of the projector at surfaces of constant color. Defective alignment of color channels will be corrected as well (correction of divergence).

Particular fields of application of the invention relate to display devices for direct and indirect projections by means of data and video projectors, to support screens of overhead projectors as well as to television and monitor display technologies. The invention may either be used to equip systems wherever they are being used or to calibrate apparatus during their final assembly. The invention may also be applied to stereoscopic image projections.

DESCRIPTION OF THE SEVERAL DRAWINGS

The novel features which are considered to be characteristic of the invention are set forth with particularity in the appended claims. The invention itself, however, in respect of its structure, construction and lay-out as well as manufacturing techniques, together with other objects and advantages thereof, will be best understood from the following description of preferred embodiments when read in connection with the appended drawings, in which:

DETAILED DESCRIPTION OF THE PREFERRED EMBODIMENTS

Figure 1:
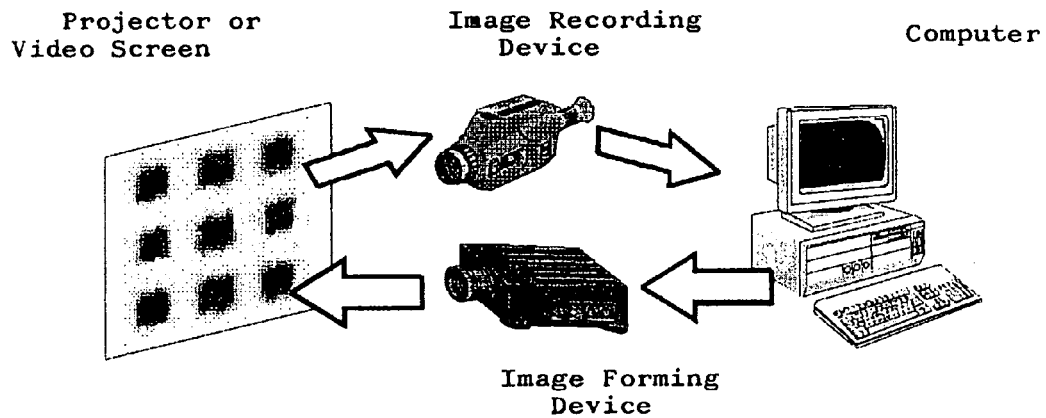
FIG. 1 depicts a basic structure for practicing the invention.
Figure 2:
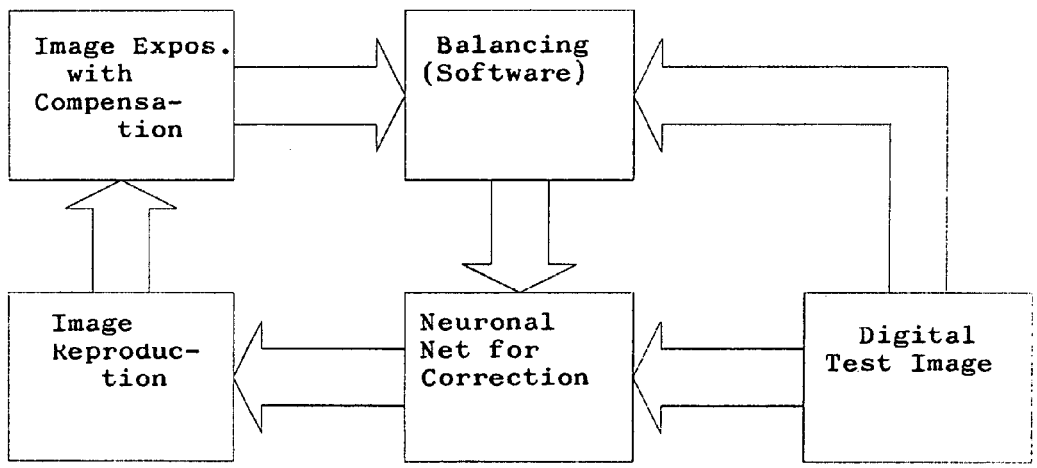
FIG. 2 is a schematic presentation of the training process in accordance with the invention.

The images to be reproduced (FIG. 1) are stored in digitized format in a computer connected to an image reproduction device such as a computer. The term "computer" in FIG. 1 stands for hardware and/or software components to perform training and recall of the neural network for correction.

The method is carried out in two steps: The first step is a learning step (balancing), which is followed by the actual operation. An image recording device, e.g. an electronic camera, is used for balancing the correction and for taking an exposure of a test image which is stored in a computer or other appropriate circuitry. To avoid further errors, the image recording device must be of a higher image quality than the image reproduction device to be corrected. Otherwise, interfering image forming characteristics of the image recording device will have to be compensated prior to further processing.

Figure 4A:
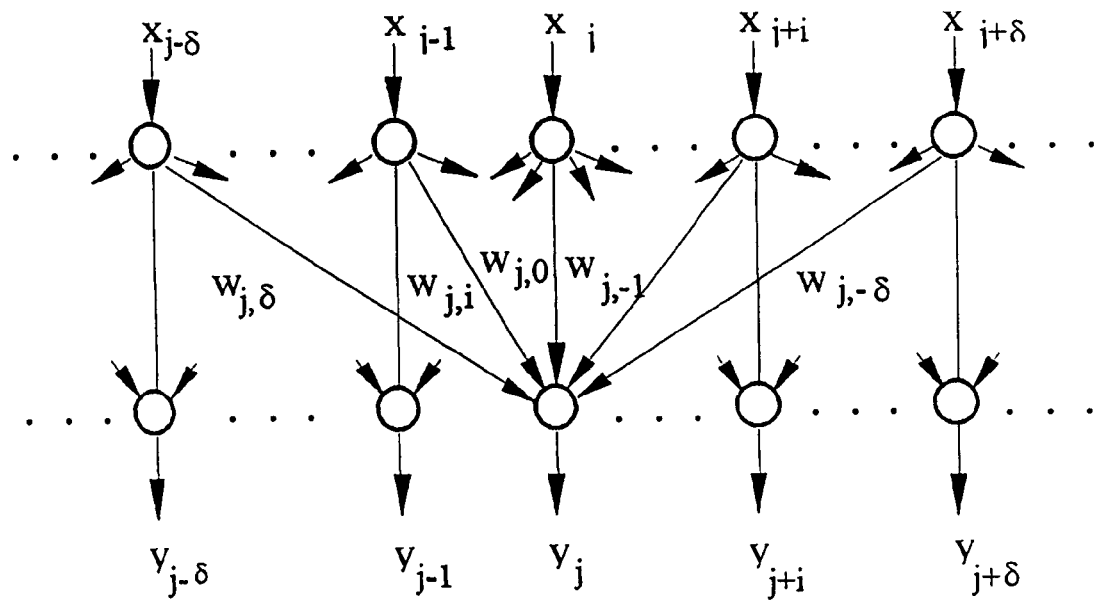
FIG. 4a depicts the specific structure of an artificial neuronal net for pre-correction.
Figure 4B:
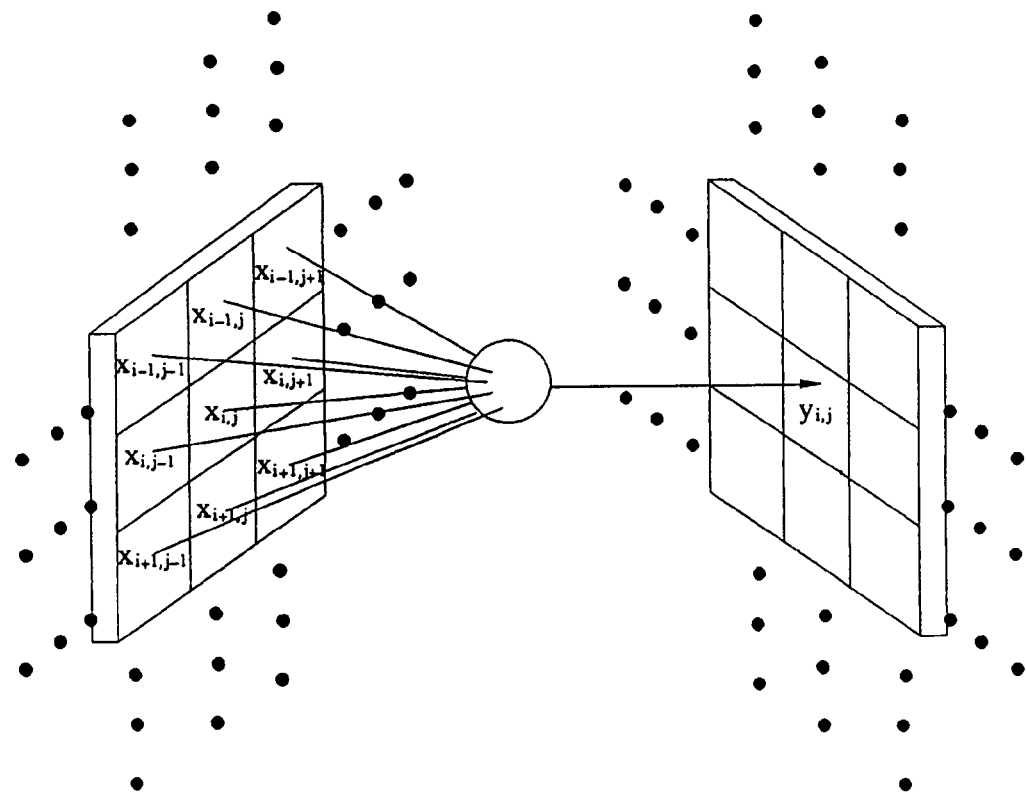
FIG. 4b depicts the connection to an individual neuron.
Figure 4C:
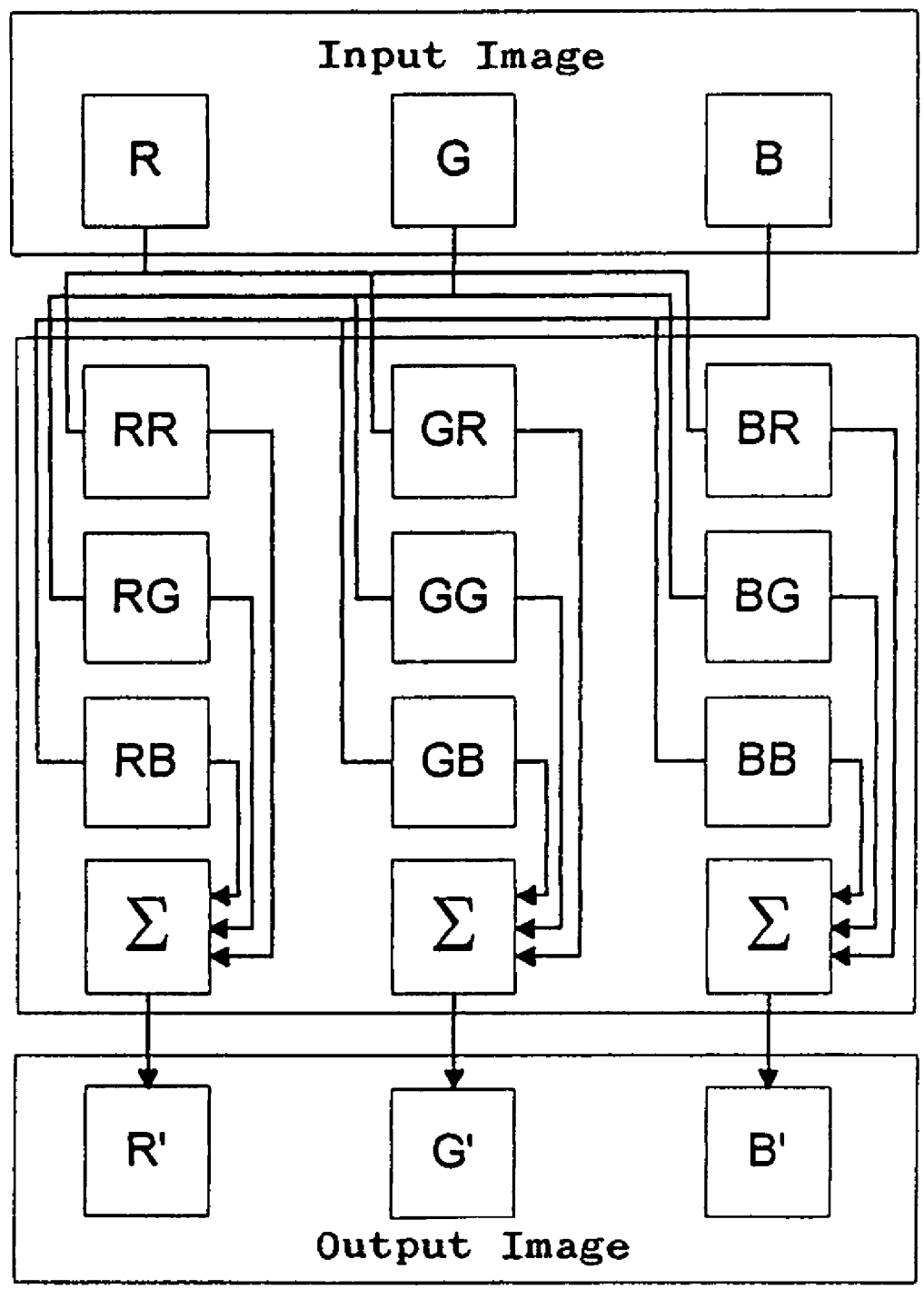
FIG. 4c shows the realization of basic colors red, green and blue.

FIG. 4 is a simplified schematic presentation of an artificial neuronal net as a locally functioning digital filter of the kind used for the correction of image data. Assuming the overall system to be a linear one, the neuronal net used is a mono-layered one as shown in FIG. 4a. FIG. 4a is a simplified uni-dimensional rendition suitable for a single color channel. The inputs $x_j$ constitute the pixel values of the image which are connected to each other by weights $w_{ij}$ as a result of the learning process. In an actual two-dimensional case, neurons are also connected to adjacent ones, but they are not confined to one line as shown in the example of a single neuron in FIG. 4b. For a comprehensive correction $N^2$ neuronal nets of the kind shown in FIG. 4b are required for N color channels. FIG. 4c depicts an example of a system of the primary colors red, green and blue (R,G,B). Each corrected color channels R', G', B' thus results from the sum of the outputs of the neuronal nets RR,RG,RB,BR,BB,BG,GR,GG,GB fed by channels R, G and B.

Balancing of the system for correction is carried out by training the neuronal net with a computer. The test image which contains the errors to be corrected is digitally stored as a teaching pattern and is used to gather learning data for the artificial neuronal network. Since the test image is stored free of errors in the computer, it directly defines the target training pattern of the training process.

Figure 5:
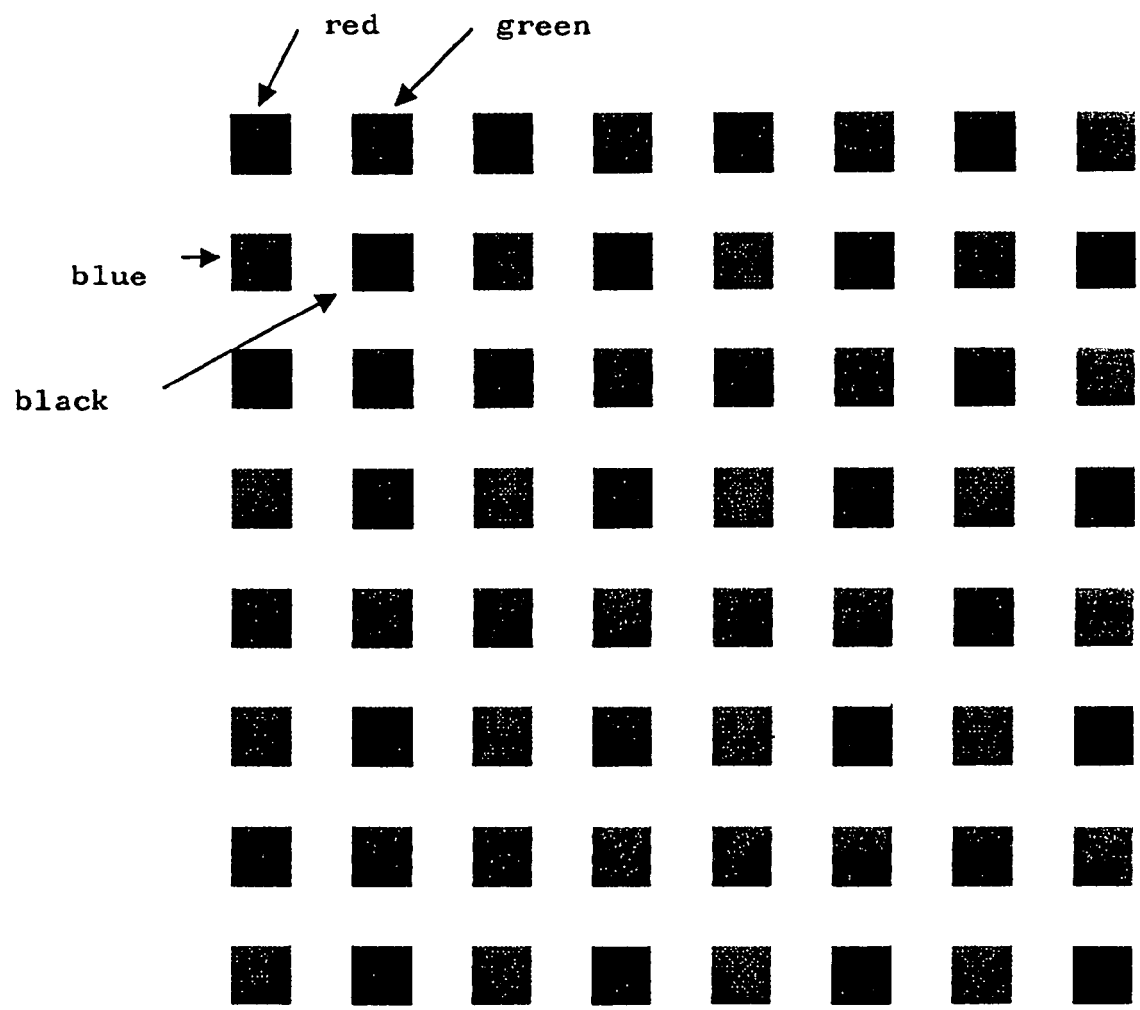
FIG. 5 is a typical test image for obtaining learning data.

The test image may be a relatively simple structure (FIG. 5). The artificial neuronal net derives the parameters required for the correction from the target data in connection with the learning pattern, by defining the weights $w_{ij}$ of the neuronal net on the basis of comparing the outputs of the neuronal net $y_j$ with the learning pattern. In a manner distinct from U.S. Pat. No. 5,091,773 the training process provides a localized sliding detection of corrective values, thus avoiding the need for interpolation.

Once the learning step is completed, the inputs of the neuronal net will be fed with data of an image to be reproduced, and the outputs of the neuronal net will be pixel values for direct input to an image reproduction device which is thus stimulated by modified original image forming data. The conversion program of the balanced correction system may be provided by a conventional PC or by an application specific circuit. In a manner distinct from European patent application 934,653, no manipulation of the deflection and intensity modulation of the image forming device is necessary.

Figure 3:
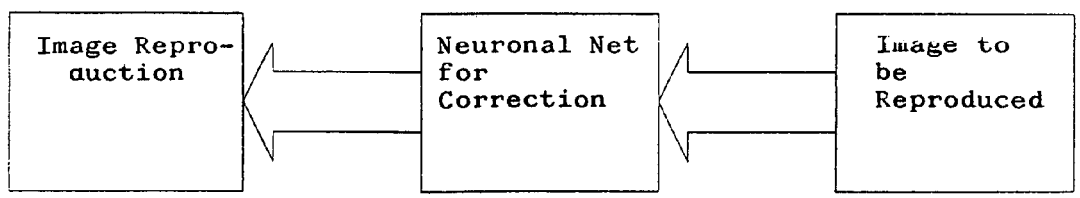
FIG. 3 is a schematic presentation of a correction process in accordance with the invention.

During the ongoing operation (FIG. 3) corrected images are produced such that no more errors are visible on the projection or image screen. The correction system may be integrated into the signal flow pattern to eliminate any image forming errors caused by the optics and projection.

What is claimed is:

1. An apparatus for defining and at least partially correcting errors of an image reproduction system, said errors being deviations between an image of predetermined quality and its reproduction, said errors being caused by defects related to color channels in the image reproduction system, comprising:

image inputting means feeding $N^2$ neuronal nets for N color channels, with output of the neuronal nets being added and connected to inputs of an image reproduction device for correction of said N color channels;

neuronal nets spatially coupling pixel values of different color channels of image data to be reproduced by mono-layered neuronal networks via space-variant weights, implemented on a predetermined circuit, comprising parameters established by a learning process on the basis of a reproduced test image of predetermined quality, a storage for image data to be reproduced that connects to inputs of the neuronal nets and feeds the pixel values of different color channels to the inputs of the neuronal nets as target data; and an image recording device, for generating digital data of an uncorrected image of a test image provided by the image reproduction device, connected to the inputs of the neuronal nets during the learning process for defining the parameters of the neuronal nets.

2. A method of defining and at least partially correcting errors of an image reproduction system, said errors being deviations between an image of predetermined quality and its reproduction, such errors being caused by defects in the image reproduction system, the method comprising the steps of:

feeding image data to be reproduced to $N^2$ neuronal nets as target data, wherein the errors are related to color channels and wherein the correction of N color channels requires adding the outputs of said $N^2$ neuronal nets;

spatially coupling the pixel values of color channels by mono-layered neuronal networks via space-variant weights;

determining the parameters of a neuronal net by a learning process utilizing the image captured by an image recording device of a reproduced test image of predetermined quality as a learning pattern; and operating an image reproduction device on the basis of the data processed by the neuronal net implemented by a computer or a specific circuit.

3. The method of claim 2, further comprising the steps of:
deriving target data for the neuronal nets from digitized data of an original image to be reproduced;
capturing a reproduced uncorrected test image by an image recording device; and
training the neuronal nets with data produced by said image recording device and said target data.

4. The method of claim 2, further comprising the step of determining parameters of the neuronal nets from values derived from an image recording system with a quality of image formation greater than the quality of the image reproduction system to be corrected, if the errors to be corrected are larger than the device-by-device variances of the image defects to be corrected.

* * * * *